United States Patent [19]
Danne et al.

[11] Patent Number: 5,761,619
[45] Date of Patent: Jun. 2, 1998

[54] DISTRIBUTED TELECOMMUNICATIONS SYSTEM

[75] Inventors: Anders Danne, Kista; Steinar Dahlin, Järfälla, both of Sweden

[73] Assignee: Telefoanktiebolaget LM Ericsson, Stockholm, Sweden

[21] Appl. No.: 408,863

[22] Filed: Mar. 23, 1995

[51] Int. Cl.$^6$ ............................. H04Q 7/00; H04Q 7/22
[52] U.S. Cl. .................... 455/422; 455/436; 455/442; 455/439; 370/328
[58] Field of Search .................. 379/58, 59, 60; 455/33.1, 33.2, 33.3, 54.1, 54.2, 53.1, 188.1, 422, 428, 429, 432, 436–438, 442, 502, 507, 562; 370/328, 331, 336, 338

[56] References Cited

U.S. PATENT DOCUMENTS

| | | | |
|---|---|---|---|
| 4,827,499 | 5/1989 | Warty et al. | |
| 5,195,090 | 3/1993 | Bolliger et al. | |
| 5,243,598 | 9/1993 | Lee | |
| 5,278,892 | 1/1994 | Bolliger et al. | 379/60 |
| 5,657,374 | 8/1997 | Russell et al. | 455/422 |

FOREIGN PATENT DOCUMENTS

| | | | |
|---|---|---|---|
| 0 522 772 A2 | 1/1993 | European Pat. Off. | |
| 0538635 | 4/1993 | European Pat. Off. | |
| 3-283725 | 12/1991 | Japan | |
| 4-124919 | 4/1992 | Japan | |
| 4-177929 | 6/1992 | Japan | |
| 460750 | 9/1989 | Sweden | H04L 11/16 |
| WO 90/05432 | 5/1990 | WIPO | H04Q 7/04 |
| WO90/05432 | 5/1990 | WIPO | |
| WO 94/00959 | 1/1994 | WIPO | |
| WO 94/28690 | 12/1994 | WIPO | |

OTHER PUBLICATIONS

Ming-Kang Liu, "Base Station Networking in Personal Communications" IEEE Transactions on Communications, vol. 41, No. 6, Jun. 1993, pp. 932–939.

M. Ogasawara et al., "High Isolation Analog 4×4 Matirx Switch LSI for Centralized Control Microcell Radio Systems", IEEE Personal Indoor Mobile Radio Communication '94, pp. 369–373, 1994.

(List continued on next page.)

Primary Examiner—Dwayne Bost
Assistant Examiner—Nay Maung
Attorney, Agent, or Firm—Burns, Doane, Swecker & Mathis, L.L.P.

[57] ABSTRACT

A cellular telecommunications system has a plurality of nodes, each for performing at least one of a number of cellular telecommunications system functions, including base station, speech coder, control processing, signal processing, local handoff, location register, and network interface functions. The nodes are interconnected by a network preferably comprising an optical fiber cable. In one aspect of the invention, the protocol that is used on the network is a high speed synchronous protocol, such as the DTM protocol. A first node in the system may be an antenna; an RF component coupled to the antenna; an analog-to-digital converter having an analog port and a digital port, the analog port being coupled to the RF component; and an optical fiber modem for connecting the digital port of the analog-to-digital converter to the network means. A second node in the system may be for performing base station controller functions, wherein the first and second nodes, together, operate as a distributed base station. In another aspect of the invention, some of the nodes may be transceivers, while other nodes include antennas coupled to frequency band filters. The network operates to permit any of the transceivers to be coupled to any one or more of the antennas, thereby permitting a handoff of a call from one antenna to another while maintaining use of the same transceiver, or permitting a handoff of a call from one transceiver to another while maintaining use of the same antenna.

10 Claims, 8 Drawing Sheets

OTHER PUBLICATIONS

T. Hattori et al., "Personal Communication: –Concept and Architecture–", *IEEE International Conference on Communications ICC '90*, pp. 1351–1357, vol. 4, Apr. 16–19, 1990.

S. Miura et al., "Centralized Control Method for Fiber–optic Microcell Radio System," *Proceedings of IEEE Vehicular Technology Conference*, pp. 353–356, 1994.

R. Ohmoto et al., "Fiber–Optic Microcell Radio Systems with a Spectrum Delivery Scheme," *IEEE Journal on Selected Areas In Communications*, pp. 1108–1117, vol. 11, No. 7, Sep. 1993.

H. Ichikawa et al., "A Microcell Radio System with a Dynamic Channel Control Method," *Proceedings of the 43rd IEEE Vehicular Technology Conference*, pp. 617–620, 1993.

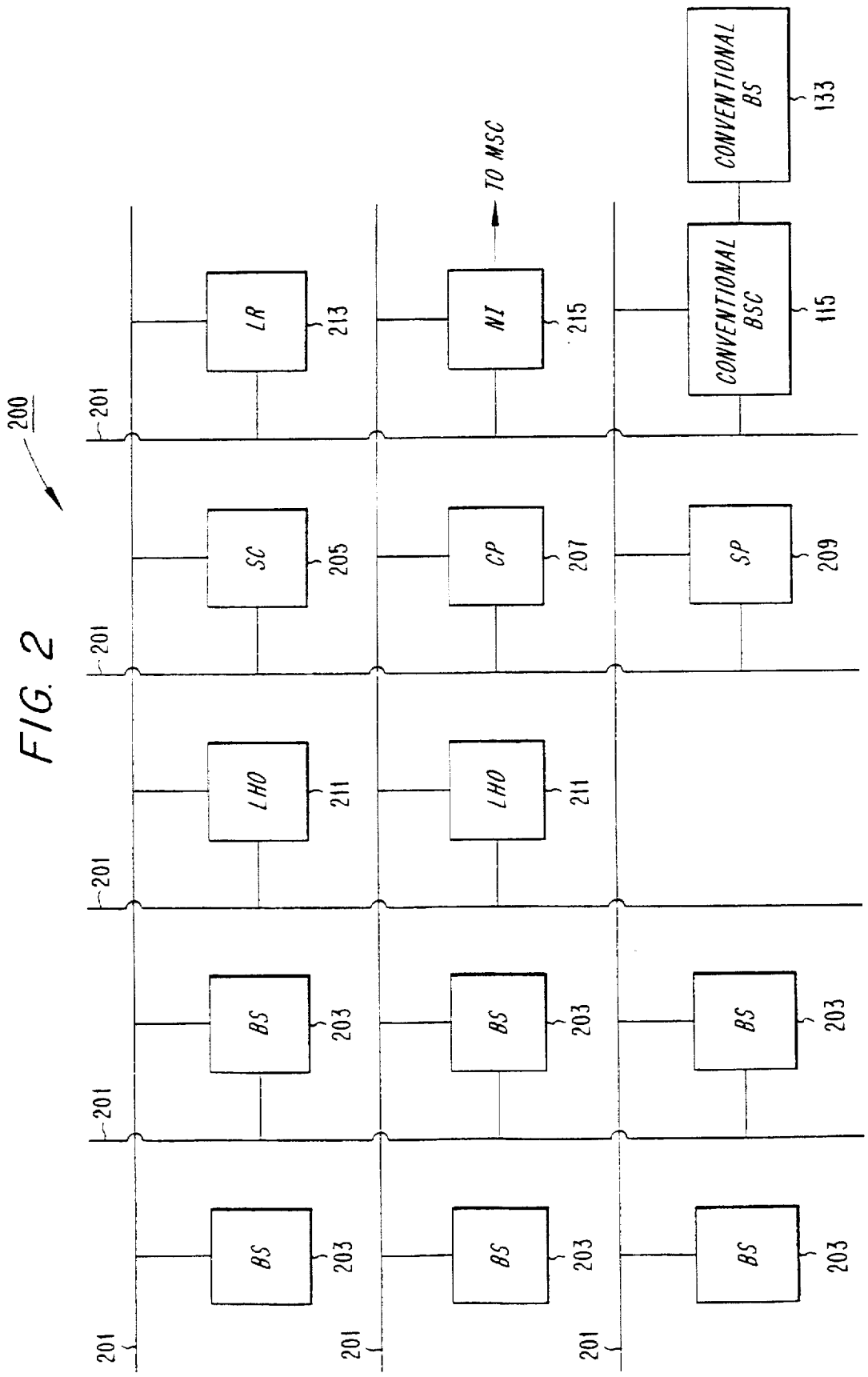

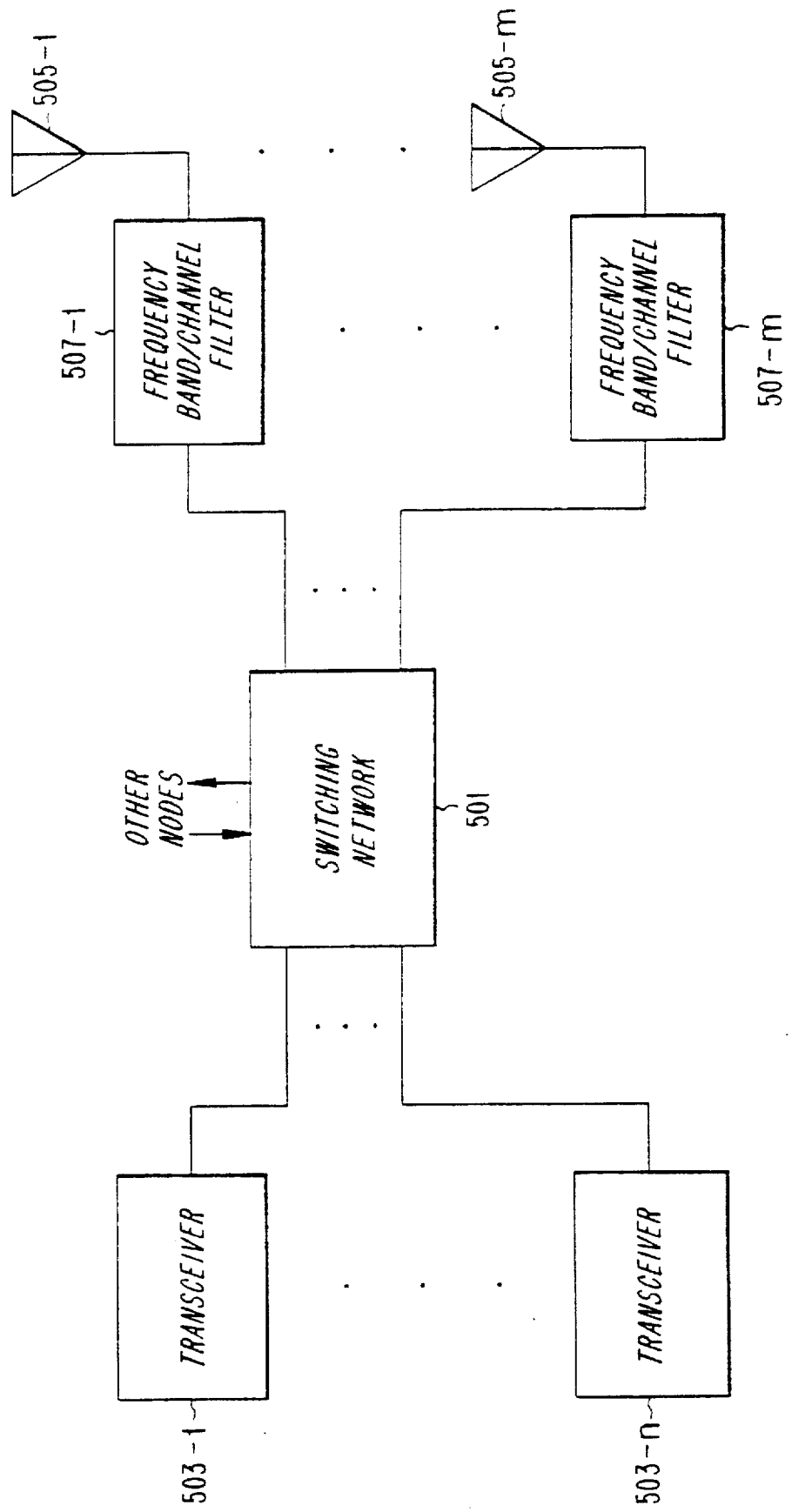

DISTRIBUTED TELECOMMUNICATIONS SYSTEM

BACKGROUND

The present invention relates to cellular mobile radiotelephone systems. More particularly, the present invention is directed to a cellular mobile radiotelephone system having distributed components that communicate with one another by means of a synchronous protocol.

Conventional cellular mobile radio telephone systems (henceforth referred to as "cellular systems") are well known. A model for one such system, the Pan-European digital mobile telephone system known as the Global System for Mobile Communications (GSM), is illustrated in FIG. 1(a). The system is divided into a Switching System (SS) 101 and at least one Base Station System (BSS) 103, serving a number of predetermined geographical areas called "cells". In the illustrated system, the SS 101 comprises the following network nodes: a Mobile Services Switching Center (MSC) 105, a Home Location Register 107, a Visitor Location Register (VLR) 109, an Equipment Identity Register (EIR) 111, and an Authentication Center (AUC) 113. The exemplary BSS 103 comprises the following network nodes: a Base Station Controller (BSC) 115 and a Base Station (BS) 133. The BS 133 is divided into one or several Base Transceiver Stations (BTS) 117, which each provide service for a single cell. As can be seen from the more detailed block diagram of FIG. 1(b), the BTS 117 is further divided into Transceivers (TRX) 134, each supporting the eight time slots on one frequency, or, in a GSM system with frequency hopping, eight consecutive time slots. Although only one of each network node type is illustrated, in practice a system may consist of a number of each network node type. Furthermore, a number of BSs 133 are coupled to a BSC 115, and a number of BSC's 115 are coupled to an MSC 105. The system may also include other functional components, such as an Operation and Support System (OSS) 131. The SS 101 and BSS 103 cooperate to provide a communications link between a Mobile Station (MS) 119 (also referred to as a "mobile subscriber", or just "subscriber") that is located within the cell being served by the BS 133, and any of a number of well-known land-based networks (generally referred to throughout this disclosure as the "networks"), including for example, the Integrated Service Digital Network (ISDN) 121, the Packet Switched Public Data Network (PSPDN) 123, the Circuit Switched Public Data Network (CSPDN) 125, the Public Switched Telephone Network (PSTN) 127, and the Public Land Mobile Network (PLMN) 129. A complete description of these well-known components is beyond the scope of this disclosure. However, a short explanation of these features will now be presented.

The BTS 117 is the radio equipment needed to serve one cell, and in fact may be thought of as being local cell equipment rather than base station equipment. It contains the antenna system, the radio frequency power amplifiers and all of the digital signal processing equipment needed to operate the cell. The BTS 117 is coupled to the BSC 115.

The BSC 115 is the functional unit that controls and supervises the BTS's and the radio connections in the system, including handoff, traffic channel selection and connection supervision. This is accomplished by means of a control processor (not shown) within the BSC 115. The BSC 115 is coupled to the MSC 105 by means of an interface (not shown) to a transmission network (described below).

The MSC 105 serves as an interface between the BSS 103 and the networks 121 ... 129. It is responsible for set-up, routing and supervision of calls to and from mobile subscribers. Other functions, such as authentication and ciphering, may also be implemented in the MSC 105.

The HLR 107 is the PLMN operator's database containing information about all subscribers belonging to this particular PLMN 129. The information stored in the database includes the location of the subscribers and services requested.

The VLR 109 is a data base for storing temporary information about mobile subscribers who have roamed into this particular MSC service area (i.e., "visiting subscribers").

The AUC 113 stores secret keys that authenticate the MS 119 and that are used for ciphering speech, data and signalling. Three values are created by the AUC 113. These are the authentication challenge, the authentication response and the ciphering key to be used by the network. This so-called triplet is transferred to the MSC 105 which sends the challenge to the MS 119. The MS calculates a response on the challenge and a ciphering key to be used by the MS 119. The response is transferred to the MSC 105. If the response from the MS 119 equals the response calculated by the AUC 113, the MS 119 is authentic and the call can continue using the respective ciphering keys.

The EIR 111 exists because in the exemplary system, there is a distinction between subscription and mobile equipment. Just as the AUC 113 is useful for ensuring that a particular subscriber is authentic, the EIR 111 checks the mobile equipment itself, in order to prevent a stolen or non-type-approved MS 119 from being used.

The OSS 131 is responsible for administration of the system, including mobile subscriber administration, cellular network administration, and alarm handling.

Thus, in cellular systems (not just the exemplary GSM system illustrated in FIG. 1(a)), components comparable to the GSM switching system constitute an interface between the radio-based cellular system and the networks, including the PSTN. Components comparable to the GSM base station system similarly act as a conduit for information between the mobile stations and the switching system. Calls to and from mobile subscribers are switched by the switching system. The switching system also provides all signalling functions needed to establish the calls.

In order to obtain adequate radio coverage of a geographical area, plural base stations are normally required. The geographical area is divided into cells, and each cell may either be serviced by its own base station or may share a base station with a number of other cells. Each cell has an associated control channel over which control (non-voice) information is communicated between the mobile station in that cell and the base transceiver station. Generally, the control channel includes a dedicated channel at a known frequency over which certain information is communicated from the base transceiver station to mobile stations, a paging channel for unidirectional transmissions of information from the base station to the mobile station, and an access channel for bi-directional communications between the mobile stations and the base station. These various channels may share the same frequency, or they may operate at different respective frequencies.

In addition to a single control channel, each cell may be assigned a predetermined number of voice channels for communicating the content of a communication between subscribers. That content may be analog or digitized voice signals or digital data signals. Depending on the access mode of the cellular system, each voice channel may correspond to a separate frequency in Frequency Division Multiple Access (FDMA), a separate frequency and time slot or slots in Time Division Multiple Access (TDMA), or a separate code in Code Division Multiple Access (CDMA). The present invention may be implemented using any of these multiple access techniques.

Typically the cells are of relatively small size, and there is a high probability that a mobile station will move from one cell to another. The process of transferring an ongoing mobile communication from one cell to another cell is called "handoff". It is important that handoffs be accomplished rapidly and reliably if communications are to continue without interruption as mobile stations exit one cell and enter another.

In the exemplary GSM system, handoffs (also referred to as "handovers") may take one of three forms: intra-BSC, inter-BSC/intra-MSC, and inter-BSC/inter-MSC. Both the BTS 117 and the MS 119 continuously measure a signal parameter, typically signal strength, of an ongoing call. Other parameters, such as signal quality as indicated by a bit error rate (BER), may also be monitored. The MS 119 additionally makes signal strength measurements on surrounding cells. All measured values are then transferred to the BSC 115, which filters and compares them. When the relationship between the various measured signal parameters associated with a particular mobile station passes a predetermined threshold, indicating that the cell border has been passed, the BSC 115 initiates a handoff of that call connection by selecting a new target BTS 117 and an associated traffic channel to take over the handoff call connection. The BSC 115 then uses the existing connection between the BTS 117 and the MS 119 to order the MS 119 to tune to the selected new traffic channel of the target BTS 117. The new BTS 117 then takes over the call connection for the MS 119.

Inter-BSC/intra-MSC handoffs are as described above, and additionally include actions taken in the MSC 105 to synchronize activities between the two BSCs involved, the old BSC 115 making decisions and the new one selecting resources. Inter-BSC/inter-MSC handoffs further require actions to synchronize activities between two MSCs.

Traditional base stations have their constituent components physically situated close to one another. However, many of the above-described components of the cellular system are usually not disposed in one location, but are instead separated from one another by some distance. Information to be communicated between the various components, such as between the BSC 115 and the MSC 105, is usually transferred on links operating at 64 kilobits per second (kbps) per channel. This bit rate is sufficient for speech and data communication with a low bit rate (e.g., on the order of 10 kbps up to 64 kbps), but not for high-speed data greater than 64 kbps.

As the importance of cellular systems continues to grow, a number of factors will make existing systems increasingly inadequate. To begin with, the growing use of mobile communication will require a higher traffic-handling capacity (i.e., the number of mobile stations that can simultaneously be serviced within any given geographical area) than is now available. This results not only from an increase in the number of users being served by the system at any given moment, but also from the likelihood that more subscribers are "visiting" another area, which increases the network signalling associated with roaming.

The ability of the cellular system to move data from one point to another will also be increasingly strained as new improved speech quality and high speed data services providing megabits per second (Mbps) bit rates to the user, are introduced. Also, by utilizing so-called "soft information", it is possible to improve service decoding and handoff performance. However, carrying soft information throughout the fixed network may increase the network load by a factor of ten. Improved service quality, especially during handoff, may also be improved by combining signals received by two or more BTS's (so-called "soft handoff"). This signal combination must occur at a BSC, which would receive the two signals from the respective BTS's. It is apparent, however, that the fixed network would have to carry more than one concurrent connection in order to provide this benefit to a single call.

Cellular systems will further require the ability to synchronize the operation of base station systems, in order to support radio technologies such as CDMA and simulcast networks. Multicast transmission, where two or more BTS's transmit the same signal, need to be synchronized within microseconds of each other.

Efforts to solve some of the above-described problems can, themselves, produce requirements beyond the capabilities of present-day cellular systems. For example, one method of increasing the system's traffic capacity is to have a higher degree of radio frequency reuse. (Radio frequency reuse refers to the fact that radio frequencies are assigned for use by particular cells in a manner so as not to interfere with communications in neighboring cells. However, because the number of assignable frequencies would be exhausted before assignments had been made to each cell in the system, the frequencies assigned to one cell are very often also assigned to a more distant cell that is unlikely to cause interference in, or experience interference from, the first cell.) To accomplish greater radio frequency reuse, the physical size of cells is reduced (by reducing the signal strength of radio signals between the BTS and the MS) so as to create what are called micro- and pico-cells. Of course, if the same overall geographical area is to be served by the cellular system, then the use of micro- and pico-cells means that more BTS's are required, thereby requiring a corresponding increase in data and signalling transmission capacity between the BTS's and the rest of the system.

Also, the strategy of replacing traditional cells with micro- and pico-cells cannot succeed unless the base stations are made smaller and less complex. Base stations of traditional size are too large to be used, for example, on street corners and in offices. Furthermore, the cost of having to provide so many more traditional base stations would become prohibitive.

As a solution to the base station size and cost problems, distributed base station systems have been proposed. That is, instead of locating the BTS components in a single cabinet, size and cost can be reduced by locating, at each cell, only those components actually required for radio transmission (referred to here as RF components). The signal processor (SP), control processor (CP), and network interface (NI) units can be placed in a remote location.

This may be better understood by referring to FIG. 1(c), which illustrates the function chain and data reduction/expansion steps that are performed by a base station during the conversion of base band signals (user data) to/from radio energy signals for transmission/reception by an antenna. Traditionally (e.g., NMT, AMPS), all of the functions illustrated in FIG. 1(c) are performed by a single base station unit, which with the exception of the antenna block 161 constitutes the traditional transceiver. However, systems such as GSM and D-AMPS distribute base station functions by splitting the chain between the baseband coding/decoding block 151 and the channel coding/decoding block 153. Thus in GSM, for example, the functions specified in blocks 153–161 are performed in a BTS 117, while the baseband coding/decoding function 151 is performed by a BSC 115. In another example, known as Personal Digital Cellular (PDC), implemented by NTT/NEC, the functional chain is split between the channel coding/decoding block 153 and the modulation/demodulation block 155. This solution, however, has drawbacks because demodulation can produce soft information that can be used to enhance the performance of the channel decoding block 153. However as a result of the split and the limited available transmission bitrate, the prior art solutions are incapable of communicating the soft information to the channel decoding block 153, so this enhanced performance is lost. Note that soft information can also be used by the baseband decoding block 151. However, because the amount of it is far less than is required by the channel decoding block 153, the necessary soft information can be communicated over narrow band transmission links in those solutions (e.g., GSM, D-AMPS) that make the split between the baseband coding/decoding block 151 and the channel coding/decoding block 153.

As a further example of distributed base stations, there are providers of so-called "micro cellular equipment" that split the chain inside the channel filtering block 157. Such equipment is normally external to the system supplier and can only interface the systems on the radio side of the transceiver. With this solution, the function chain contains equipment at three locations: baseband coding at an MSC/BSC site, antenna equipment plus band wide filtering and parts of channel wide filtering at the antenna site, and the rest of the equipment, the basic transceiver, at a central site located somewhere in-between the BSC site and the antenna site. A wideband communication medium is utilized between the antenna site and the central site. For analog radio, the wideband communication medium might be a coaxial cable or optical fiber; for digitized radio, it might be optical fiber. The amount of channel wide filtering at the antenna site differs from none to substantial, implying different bandwidth requirements on the connection.

In addition to size reduction achieved by the use of fewer components, the RF components themselves can be reduced in size by having them perform analog to digital (A/D) conversion of the radio signal for only that part of the radio band (approximately 10 MHz) that is to be used by the micro- or pico-cell.

A problem created by the introduction of distributed base station systems, however, is the fact that the variously distributed components need to communicate with one another. It is estimated that the communications link between the RF components and the signal processor must be capable of carrying several hundred megabits per second.

PCT International Application Number PCT/GB89/01341, published under International Publication Number WO 90/05432 on May 17, 1990, discloses a distributed base station in which an optical fiber is used as the medium for conveying information between the RF component and a remotely located SP. However, this publication does not disclose encoding the information in accordance with any protocol for transmission on the optical fiber, with the result that the fiber can be used to convey only a single channel, namely, the digitized radio signal from one RF component to the SP. That is, each RF component has a dedicated optical fiber for communicating with a corresponding SP.

It is desirable, when the base station has plural RF components, for them all to be served by the same SP. This is true for cost reasons (a shared powerful SP is more cost effective than many individual SP's) and also because servicing and maintenance of the cellular system (including installation of new hardware and downloading of new software revisions) is made easier when the number of components is reduced to only a few places. However, the prior art fails to show a shared SP. The sharing of SP's need not be confined to a single cellular system. A single geographical area may be served by completely different wireless networks, such as CDMA and the Digital Advanced Mobile Phone Service (D-AMPS). Therefore, even further cost effectiveness can be achieved by designing a system in which the processing capabilities of a single SP is shared among these coexisting cellular systems.

Furthermore, it is desirable for the optical fiber to be capable of conveying plural channels, so that it can be shared by the various RF components in a bus or mesh topology. This would avoid the necessity for complicated star-shaped topologies using individual optical fiber links. The conventional system also requires that SP/RF component communications other than the digitized radio signal be carried on separate links. Examples of such other communications include control signals, alarms and a service channel for speech. These separate links increase the cost of the system.

The arguments set forth above for the desirability of distributing the base station signal processing functions are equally applicable to the base station's CP. That is, moving the CP out of the BTS and disposing it in a remote location where it can be shared by plural RF units achieves the above-described cost savings and simplification of service and maintenance. But here too, the coupling between the CP and the various RF units needs to be capable of handling the above-described speed and synchronization requirements not shown by conventional systems.

The preceding discussion points out the need to achieve higher data communication bandwidth in future cellular systems as a result of the need for higher traffic capacity, smaller cells, less expensive base stations and centralized signal processing. Certainly the present PCM links are inadequate to the task. It has been proposed to use the well-known asynchronous transfer mode (ATM) protocol in place of the present PCM links, in order to meet some of the future demands. ATM is a method for the switching of channels or groups of channels in packetized format and contained in broadband (150–600 megabits per second) channels for BISDN communications. However, the ATM protocol has a number of drawbacks that limit its usefulness for this purpose.

First, an ATM system requires that access points be connected in a star topology, with individual fibers going to each node. Consequently, the fiber cannot be used as a bus in a network which can be accessed anywhere.

Further, ATM requires that each cell header be processed in an ATM switch. Consequently, the processor at a node is loaded even after a connection has been established.

The ATM protocol has other drawbacks. Because of the asynchronous nature of the protocol, it is not possible to synchronize different nodes with a high degree of accuracy. Also, multicast to a group of receivers is possible only for small groups.

SUMMARY

In accordance with the present invention, a cellular telecommunications system comprises a plurality of nodes, each for performing at least one of a plurality of cellular telecommunications system functions, such as base station, speech coder, control processing, signal processing, local handoff, location register, and network interface functions. Network means are provided for interconnecting the plurality of nodes. The network means are preferably an optical fiber cable. The network means operates in accordance with a high speed synchronous protocol, which is preferably a dynamic synchronous transfer mode (DTM) protocol.

In accordance with another aspect of the invention, the plurality of nodes includes a first node comprising an antenna; an RF component coupled to the antenna; an analog-to-digital converter having an analog port and a digital port, the analog port being coupled to the RF component; and an optical fiber modem for connecting the digital port of the analog-to-digital converter to the network means. The plurality of nodes further includes a second node for performing base station controller functions. The first and second nodes, together, operate as a distributed base station. This configuration reduces the size and cost of equipment that must be installed at the cell.

In accordance with yet another aspect of the invention, the plurality of nodes includes a plurality of first nodes and a plurality of second nodes. Each of the first nodes performs transceiver functions. Each of the second nodes comprises an antenna coupled to a first port of a frequency band filter, the frequency band filter having a second port for coupling to the network means. The network means operates as a switch for coupling any one of the first nodes to any one or more of the second nodes. With this arrangement, a single transceiver may be coupled to two or more antennas to permit multicasting of information to two or more geographical sites. Furthermore, this arrangement permits a "channel handoff" of a call to occur, whereby only the used radio channel is changed. In addition, this configuration permits the performance of an "antenna handoff", whereby only the particular antenna assigned to the call is changed, while the call continues to use the same radio channel and transceiver. This arrangement also allows a "transceiver handoff" to occur, whereby only the particular transceiver assigned to a call is changed, while the mobile station continues to communicate with the same antenna on the same radio channel.

BRIEF DESCRIPTION OF THE DRAWINGS

The objects and advantages of the invention will be understood by reading the following detailed description in conjunction with the drawings in which:

FIG. 2 is a block diagram of an exemplary base station system in accordance with the present invention;

FIG. 5 is a block diagram of another aspect of the invention, in which soft handoffs may comprise a change in antennas only, or a change in transceivers only.

DETAILED DESCRIPTION

Figure 1A:
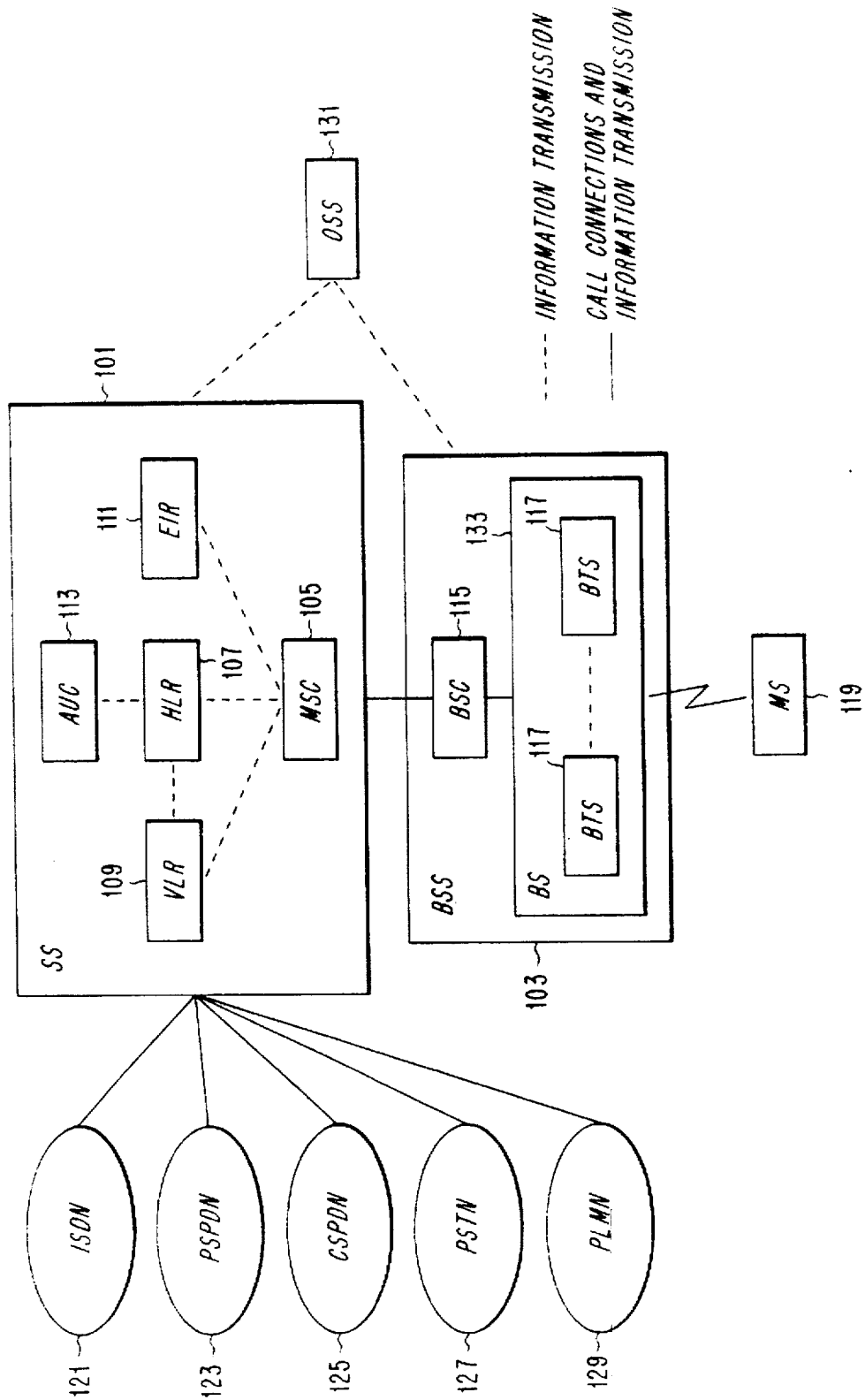
FIGS. 1(a), 1(b) and 1(c) illustrate, respectively, a block diagram of a prior art mobile telephone system, a more detailed block diagram of a base transceiver station, and a block diagram of a prior art base station function chain.
Figure 1B:
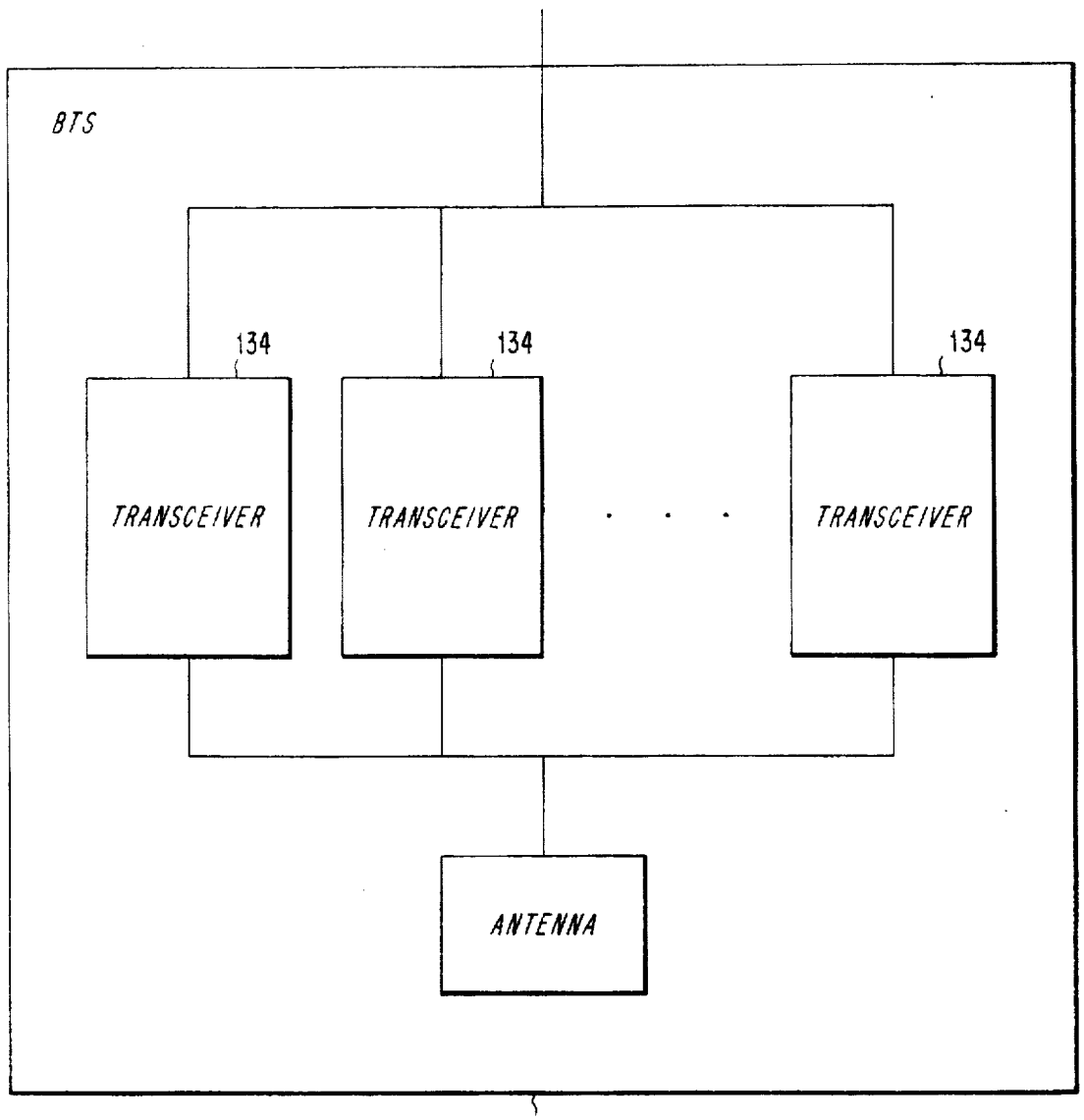
Figure 1C:
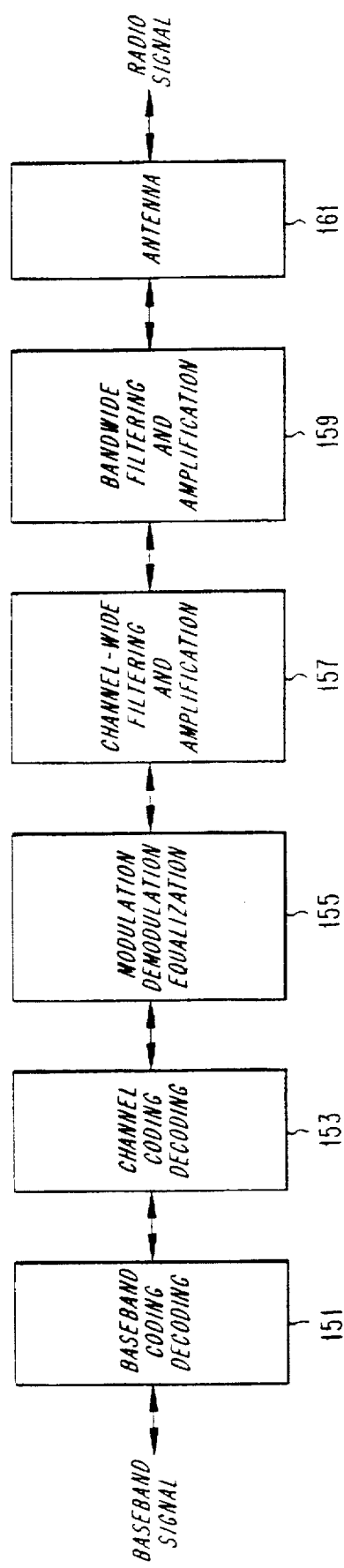

One aspect of the present invention that enables the above-identified prior art problems to be overcome is the use of a high-speed synchronous protocol, such as the dynamic synchronous transfer mode (DTM) protocol described in Swedish Patent No. SE 460 750, issued on Nov. 13, 1989 (corresponding to Swedish Application No. 8800745-5, filed on Mar. 2, 1988). DTM may also be characterized as a dynamic time slot protocol. In accordance with another aspect of the invention, synchronization between nodes is achieved by means of methods such as those taught in Swedish Patent No. SE 468 495, issued on Jan. 25, 1993 (corresponding to Swedish Patent Application No. 9101635-2, filed on May 29, 1991 and published on Nov. 30, 1992), for synchronizing two or more communication networks of the time multiplex type. The synchronization method taught in the SE 468 495 document is compatible with the DTM protocol. The entire disclosures of both the SE 460 750 and SE 468 495 documents are hereby incorporated herein by reference.

Also in accordance with the invention, well-known optical fiber technology is preferably used as the physical medium for data transmission.

By using DTM, a system can reach several gigabits per second on an optical fiber substantially without any delay occurring through a network of switches. By applying this technology as described here, a single multiwavelength fiber pair is capable of carrying the communications for a cellular system with several hundred base stations. Furthermore, over 90% of the potential bandwidth is utilizable. Thus, a single fiber pair can handle several logical channels for traffic and control by means of the DTM protocol.

The DTM protocol offers a number of advantages not found in the ATM protocol. DTM can handle very high bitrates with dynamic bandwidths on a fiber, and DTM is equally suited for multiwavelength fibers.

DTM is also designed so that switching can be performed by each node in the network. The switch is simple and processor power is only needed at the time that a connection is being established. Once the connection is established, the node's processor is not loaded, because the node needs only to process the communication to itself.

Furthermore, several DTM nodes can share a single fiber, which in this case is used as a bus which can be accessed anywhere.

DTM also provides the capability of multicasting a data stream to several nodes at the same time. The nodes can be synchronized with a high degree of accuracy.

Those skilled in the art will recognize that other transmission mediums, synchronous data protocols and synchronization methods could be substituted for those of the exemplary embodiments, so long as they at least match (if not exceed) the performance characteristics of those described here.

Various aspects of the inventive cellular system utilizing the DTM protocol and synchronization methods will now be described in greater detail.

FIG. 2 is a block diagram of an exemplary BSS 200 in accordance with the present invention. The foundation of the network is the plurality of optical fiber cables 201, which in this example are organized in a mesh topology. Other topologies may also be used, including bus and multidimensional topologies, as well as mixtures of any of these. Each of the illustrated optical fiber cables 201 is preferably a pair of optical fiber cables for providing two-way data communication between network nodes. The synchronized DTM protocol is preferably used for communication over the optical fiber cables 201.

The exemplary network consists of nodes for performing at least one of a plurality of cellular telecommunications systems functions, including base station (BS) 203, speech coder (SC) 205, control processor (CP) 207, signal processor (SP) 209, local handoff (LHO) 211, location register (LR) 213, and network interface (NI) 215 nodes. Conventional base station controllers (BSC's) 115 and conventional base stations 133 equipped with fiber modems may also be tied into the network, if desired.

The illustrated two-dimensional mesh topology is useful for providing micro-cell coverage in an urban environment. An optical fiber cable 201 may run along each street, with cross connections being made in street junctions. To cover the interior of a building, a three-dimensional bus topology (not shown) would be more appropriate. The shape of the network may be more or less complete, with complete topologies providing the advantage of additional redundancy.

Figure 3:
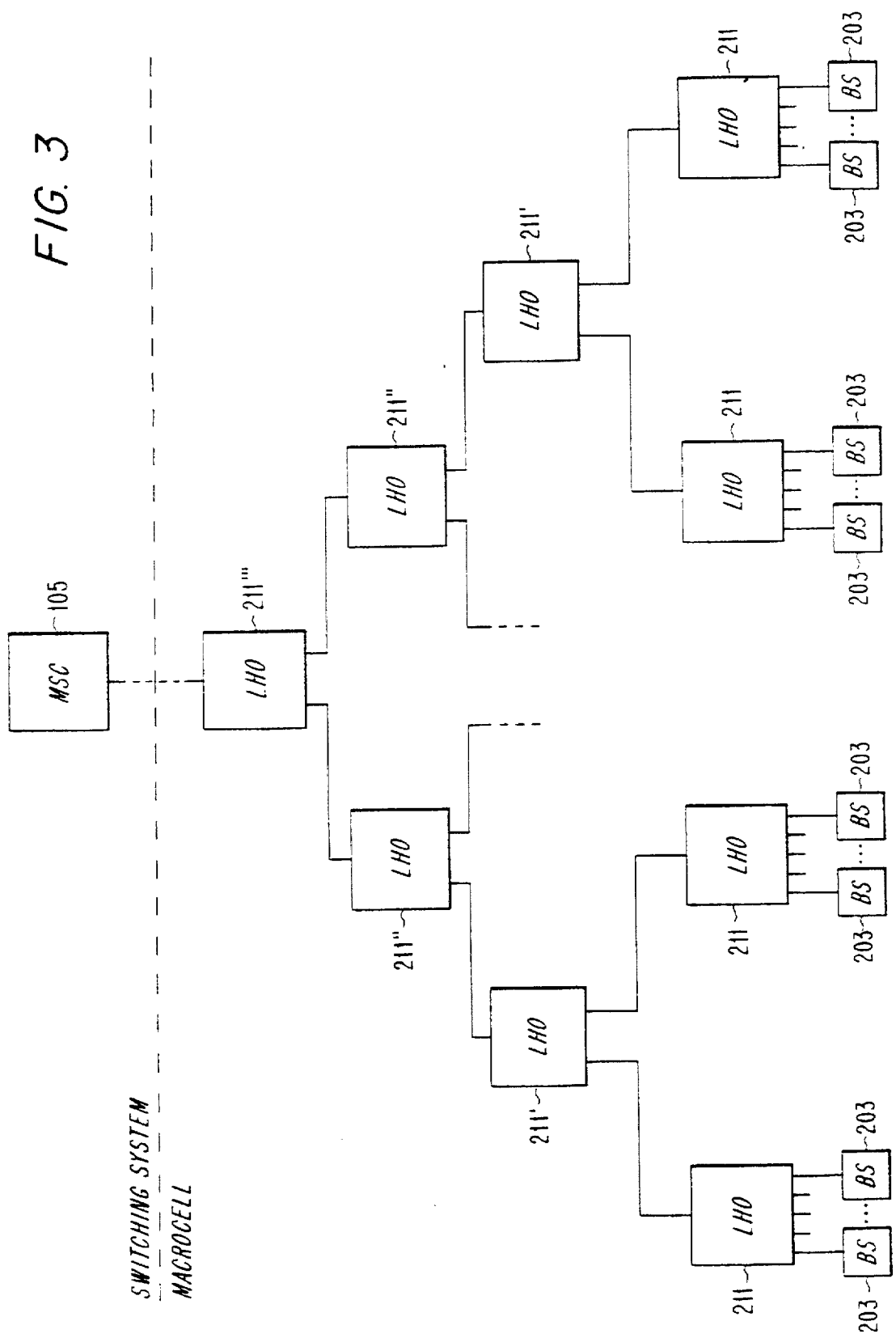
FIG. 3 is a diagram of an exemplary logical arrangement of local handoff nodes in accordance with one aspect of the present invention.

Each BS 203 is responsible for serving a micro- or pico-cell area. The combination of all micro- or pico-cell areas may be considered to be a macrocell. The BS's 203 are preferably small units that are connected to the fiber network wherever needed to ensure continuous coverage within the macrocell. As a subscriber roams from one micro- or pico-cell to another, it will be necessary to perform a local handoff operation. (Handoffs between macrocells may still be handled by a conventional BSC 115. One or more LR's 213 are provided in the network for maintaining information about roaming subscribers. Both hard and soft handoffs are handled by the LHO 211 nodes. Each LHO 211 is responsible for a local area of BS's 203. The LHO's 211 are logically connected in a global hierarchy in order to achieve handoff between local areas. An exemplary logical arrangement of LHO's 211 is shown in FIG. 3. Each of the LHO's 211 on the bottom tier of this tree-like structure is responsible for controlling the handoffs between a predefined set of BS's 203. When a handoff needs to be made from one predefined set of BS's 203 to another, the corresponding LHO 211 makes a request to the LHO 211' on the next higher tier. Requests for handoff continue to be made to higher tiers until a control path can be established between the LHO 211 handing off the call and the LHO 211 receiving the handed off call, at which point the handoff takes place. Because the use of the synchronized DTM protocol on fiber cable provides a very high transmission capacity, the setup and delay times are low, so that global soft handoff can be achieved with little or no penalty.

If it is necessary to handoff the call from the inventive BSS 200 to a conventional BSS 103, then the handoff request is forwarded to a conventional MSC 105 by means of the NI 215 node, which serves as an interface between the optical fiber network and a conventional switching system. The coupling between the NI 215 node and the conventional BSC 115 can be made by conventional means, such as by conventional PCM or ATM.

Referring back to FIG. 2, the network is controlled by one or more distributed CP's 207.

Figure 4A:
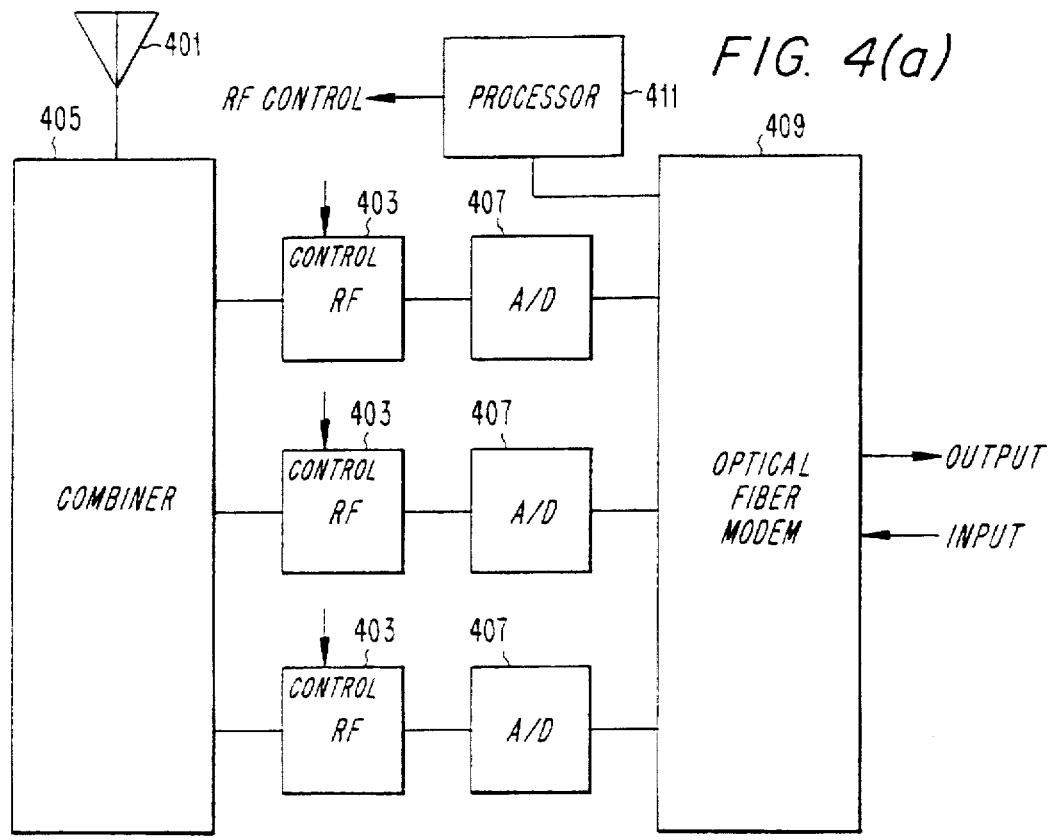
FIGS. 4(a) and 4(b) illustrate alternative embodiments of distributed base stations in accordance with another aspect of the present invention.

It was stated above that the BS's 203 are small units. In accordance with another aspect of the invention, this is achieved by having each of the BS's 203 be a distributed base station, such as either of the preferred embodiments shown in FIGS. 4(a) and 4(b). In the embodiment of FIG. 4(a), an antenna 401 is shared by, for example, three RF units 403 by means of a combiner 405. A complete description of each of these well-known elements is beyond the scope of this disclosure. Each of the RF units 403 is coupled to a corresponding analog to digital (A/D) converter 407 for digitizing the received RF signal and for converting a digital signal into an analog signal for transmission. The A/D converters 407 are in turn coupled to an optical fiber modem 409. A processor 411, also coupled to the optical fiber modem 409, controls the BS 203 so that it will communicate with the rest of the network by means of the synchronized DTM protocol on the optical fiber cables. Additional connections between the processor 411 and control inputs of the RF units 403 permit the processor 411 to also perform frequency and power control. The radio signal is digitized in the distributed base station, and sent over the optical fiber where signal processing is handled by the SP 209 (see FIG. 2). Note that the present invention provides the advantage of permitting the SP 209 to be shared by a plurality of RF units 403. Also, speech coding for a number of distributed BS's 203 is performed by shared SC's 205 in the network. Additional economy is achieved by having the network controlled by just one or only a few distributed CP's 207, and by using shared NI nodes 215 for interfacing to the regular fixed network, such as an MSC (not shown).

Because the combination of optical fiber cable and the synchronized DTM protocol provides high bitrate capability, a single fiber pair (input and output) can handle several logical channels for traffic as well as for control signals, alarms and other signals.

Figure 4B:
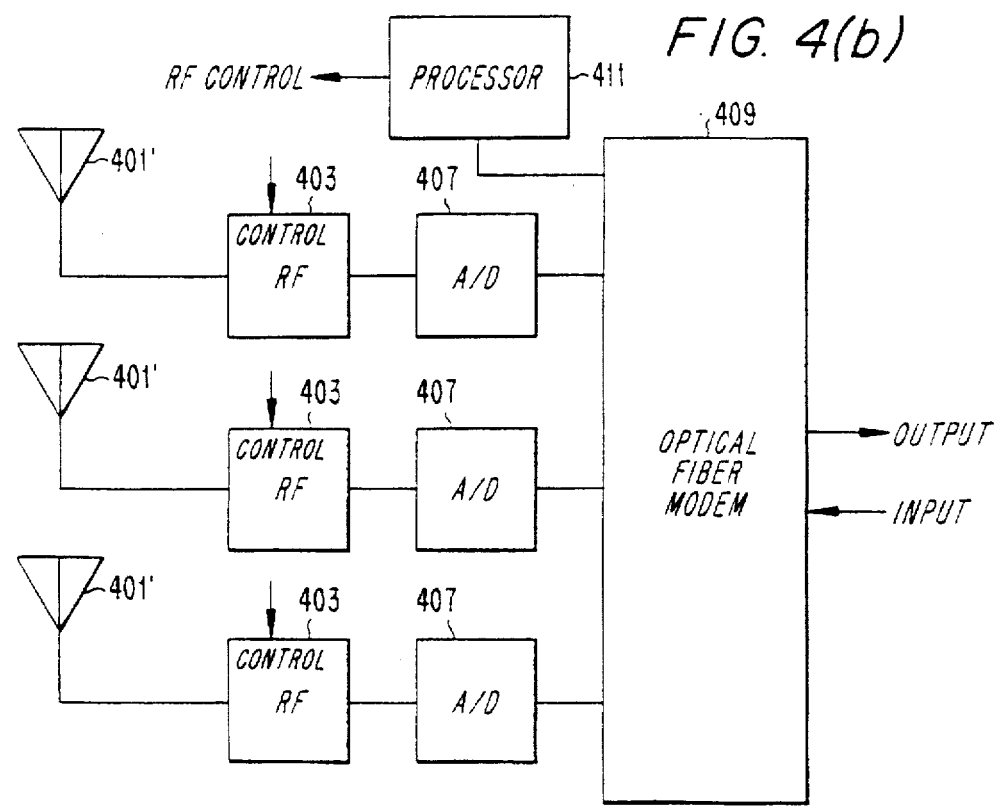

An alternative embodiment of the inventive distributed base station is shown in FIG. 4(b). This configuration is identical to that of FIG. 4(a), with the exception of individual antennas 401' being substituted for the single antenna 401 and combiner 405. Operation of this embodiment is otherwise the same as that of the configuration of FIG. 4(a).

Further in accordance with the invention, the optical fiber-based network is provided with additional capabilities. For example, local switching may be performed in the network by the CP 207, without intervention from the MSC 105. Also, the signal from one BS 203 can be sent to and processed by several SP's 209 at the same time. This is desirable in order to share the workload through the network, or to allow calls from any antenna to be handled by different processing nodes.

In addition, a single SP 209 can perform processing for several wireless standards, thereby allowing the underlying network to be shared.

Additional cellular system improvements brought about by the present invention will now be described with reference to FIG. 5. Within any one base station in conventional systems, the link between the transceiver equipment and an antenna may take one of several forms. Where the transceiver is placed at some distance from the antenna, these system elements may be coupled by a transmission medium such as optical fiber or coaxial cable. It is also known in conventional systems to connect several antennas to one transceiver, so that the transceiver may view the different antennas as rays in a multipath environment. Further, there are some proposals in which the connection between transceivers and antennas can be configured by the use of a remote controlled switch. In all of these known systems, however, such as the one described in WO 90/05432 (see BACKGROUND section), there is a strict configuration relationship between transceivers and antennas, and the relationship does not change during a call.

With any of these known transceiver/antenna configurations, the need to provide for a soft interBSC/intra- MSC or inter-BSC/inter-MSC handoff presents implementation difficulties. Soft handoff comprises, in the forward link (i.e., transmission from base station to mobile station), the simultaneous transmission of a synchronized signal from both the old and new base stations to the mobile station. In the reverse link (i.e., transmission from mobile station to base station), soft handoff requires that the signal from the mobile station be received at both the old and new base stations, that both received signals be forwarded to an MSC, and that the MSC select one on the basis of better reception quality. Thus, the possibility exists that bases stations that are involved in a soft handoff operation will be connected either to the same BSC, or to different BSCs that are either associated with the same MSC or different MSCs. In this kind of network, a call may pass through the following process:

1. A call is set up over one BS, that is connected to a first BSC.
2. The call is put into soft handoff mode by connecting it over a second BS that is connected to the same BSC.
3. The link over the first BS is disconnected.
4. A third link is set up over a BS connected to second BSC. This link may travel a long way through the transmission network, thus experiencing extensive delays. In this case, the first BSC would typically be in control.
5. The second link is then disconnected.
6. A fourth link is set up over a BS connected to a third BSC that is connected to a second MSC. At this point, two BSs, three BSCs and two MSCs are involved in the call.

It can be seen that control of all of these components becomes very complicated (i.e., who is controlling what). The links between the MS 119 and the BSs must still be synchronized and the transmission delays from each of the BSs to the corresponding BSCs must be controlled to be comparatively equal to one another.

In accordance with the present invention, this process is simplified by regarding antenna sites and transceivers as separate entities having a global switch in between. In such a network, the transceiver performs all of the synchronization and control functions. The links for soft handoff may be more than two.

If the MS 119 moves too far through the network for it to continue to be practical for the transceiver to still be responsible for the call, a transceiver handoff may be performed in order to reduce the distance between antennas and transceivers.

FIG. 5 illustrates, this aspect of the present invention, in which soft handoffs from one MSC to another are facilitated. The switching network 501 is the network described above with respect to FIG. 2, which utilizes optical fiber cables and the synchronized DTM protocol. A plurality of transceiver nodes 503-1 . . . 503-n are shown coupled to the network. (Other nodes that are also necessary for the proper functioning of the cellular system are presumed to exist, but have been omitted from the figure for the sake of simplicity.) Also included in the system is a plurality of antennas 505-1 . . . 505-m, each coupled to the switching network 501 by means of a corresponding frequency band filter 507-1 . . . 507-m, which is preferably located near the antenna. The frequency band filters 507 . . . 507-m may alternatively be frequency channel filters.

The arrangement of FIG. 5 provides a number of benefits. To begin with, big trunk groups of transceivers may be installed at easily maintained places because the placement of the transceivers 503-1 . . . 503-n is independent of the placement of the antennas 505-1 . . . 505-m. Furthermore, this configuration permits any one of the antennas 505-1 . . . 505-m to be coupled to any one of the transceiver nodes 503-1 . . . 503-n in the cellular system. As a result, two different types of soft handoff may now be defined: "transceiver handoff", and "channel handoff". Transceiver handoff consists of moving a call from one transceiver to another within the cellular system. Since the mobile station may still communicate with the same antenna, transceiver handoff is an activity that is entirely internal to the network, and may be performed, for example, to decrease the required amount of transmission resources by shortening the distance between a transceiver and its connected antennas.

By contrast, channel handoff is experienced by the mobile station, since it will change communication channel, frequencies, time slot, code or any combination thereof. The change of traffic channel may or may not imply moving from one cell to another. The reason for the channel handoff may be a need in the system to optimize the use of traffic channels or to minimize the interference levels. However, unlike that which occurs in the prior art, channel handoff does not require a corresponding change in transceivers, since the present invention provides for the old transceiver to continue handling the call by coupling it to the second antenna. As a result of this ability, a change in air interface frequency for a given call can be performed more often than in prior art systems because the disturbance on the call is reduced if the call path in the network is not changed at the same time.

The configuration shown in FIG. 5 is also useful in cell structures having macrocells and micro-cells that cover the same area and in which several micro-cell antennas and the macrocell antenna can be used for detecting the reverse link of the call. The invention permits the micro-cell antennas and the macrocell antennas to be connected to the same transceiver. In this situation, it is beneficial to be able to connect the calls that are set up in the macrocell also to a micro-cell. This makes it possible to regulate the MS output power so that it is set to a level that is appropriate for the micro-cell as the MS moves nearer to the micro-cell. Also, as the mobile station moves away from one micro-cell antenna and toward another, the selection of micro-cell antennas for use at any particular time may be dynamically reconfigured without a corresponding change in transceivers. A micro-cell antenna placed in a border area between macrocells may, at the same time but for different calls, be used in this manner together with different macro cell antennas.

The configuration illustrated in FIG. 5 is additionally useful for permitting dynamic reconfiguration or transceiver/antenna coupling in order to enhance the process of multipath equalization. Multipath equalization is necessary because radio energy from an MS may travel vast distances, including reflections, before it reaches a receiver antenna. Because different rays of radio energy travel different distances and arrive at different points in time, the received signal is subject to delay spread (also called time dispersion). By dynamically reassigning an MS to be received by a different set of antennas, the time dispersion situation may change from an unacceptable level to very good, even though the MS has not moved at all. Thus, the present invention allows a transceiver 503 to dynamically select which of a plurality of antennas 505-1 . . . 505-m provide a signal with the least amount of delayed signal energy.

An alternative embodiment of the invention will now be described with respect to FIG. 6. Here, call-based switching has been introduced between the bandwide filtering block 159 and the channel-wide filtering block 157 in the base station function chain (see FIG. 2). This provides great advantages in the ability to control radio energy consumption per call and in total. Reduced consumption of radio energy per call leads to improved spectrum efficiency and increased traffic capacity.

Figure 6:
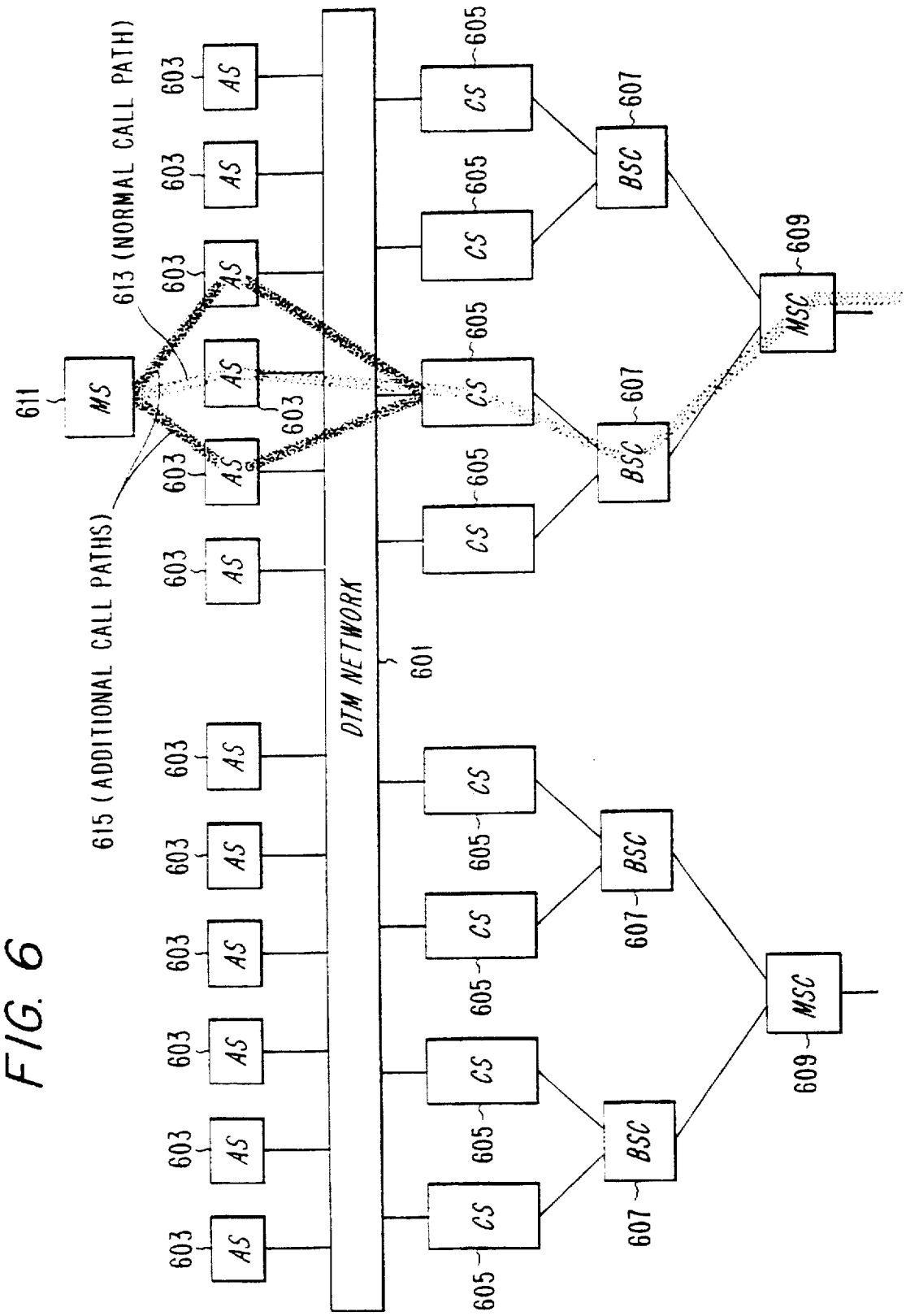
FIG. 6 is a block diagram of an alternative embodiment of the invention in which call-based switching is introduced between the bandwide filtering block and the channel-wide filtering block in the base station function chain.

As depicted in FIG. 6, a DTM network 601 is used to connect a plurality of antenna sites (AS) 603 to a plurality of central sites (CS) 605. However, in implementing this aspect of the invention, it is possible to use any digital high speed protocol, such as the well-known asynchronous transfer mode (ATM) protocol. The DTM network permits switching between any of the ASs 603 and any of the CSs 605. As shown by the thick light line, a normal call connection path 613 will be made from the MS 611 to an AS 603, and from there through a CS 605, a BSC 607 and an MSC 609 from which it is routed to the rest of the system in accordance with known methods. In accordance with the invention, more than one AS 603 can be connected to one CS 605, thereby making possible the additional simultaneous call paths 615 illustrated by the dark thick lines.

Further in accordance with the invention, the ASs 603 need not all be of the same type. That is, an individual AS 603 may be of the macro-cell type, the micro-cell type, or the pico-cell type. The respective functions performed by an AS 603 and a CS 605 will depend on the type of system being implemented. In the case of a narrow band system (e.g., AMPS, GSM, PDC), each AS 603 may include not only an antenna, but also the necessary equipment for performing channel-wide filtering/amplification 157 and bandwide filtering/amplification 159. The AS 603 includes space diversity and A/D conversion equipment on both the I and Q channels per diversity antenna. The data rate from each filter is in the range of 5 Mbps for AMPS and 25 Mbps for GSM. Each call handling unit in each CS 605 has a number of input ports to which each AS filter output for that call is connected. Thus, the input data rate for the CS 605 will be from 20 to 100 Mbps per used radio channel.

In an alternative embodiment of a narrow band system, channel-wide filtering/amplification 157 is not performed in the AS 603, but is instead performed in the CS 605. Each AS 603 has a bandwidth filter for each of the space diversity antennas connected to an A/D conversion unit on both I and Q channels. For a 15 MHz system, the data rate from the AS 603 will be approximately 2 Gbps. Data at this rate is then multicast from the AS 603 to all CSs 605 having a call that is being received by that AS 603. From the point of view of a CS 605, the CS 605 receives data from all of the ASs 603 that provide data associated with calls being handled by the CS 605. The total data rate in the CS 605 will therefore be in the range of from 10 to 100 Gbps. This embodiment is also useful for wideband systems, such as CDMA.

The above described invention provides a cost effective and versatile solution for radio access networks having very good performance. The use of synchronous protocols such as the synchronized DTM protocol on an optical fiber provides radio access networks with the high bandwidths, low delays, high utilization and fast setup times that are needed in future systems. The sharing of network nodes (such as SP 209, SC 205 and CP 207) is not only economical, but also allows the size of base stations to be reduced for easier placement in urban environments.

Because the operation of different nodes may be synchronized with one another to a high level of precision, radio technologies such as CDMA and simulcast networks may be supported.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A cellular telecommunications system comprising:

a plurality of nodes, each for performing at least one of a plurality of cellular telecommunications system functions;

network means for interconnecting the plurality of nodes, wherein the network means operates in accordance with a high speed synchronous protocol wherein the plurality of nodes includes:

a plurality of first nodes, each for performing transceiver functions on a frequency band filtered signal received from the network means; and a plurality of second nodes, each comprising an antenna coupled to a first port of a frequency band filter, the frequency band filter having a second port for coupling to the network means, wherein the antenna supplies a received radio signal to the frequency band filter, and the frequency band filter converts the received radio signal into the frequency band filtered signal and supplies the frequency band filtered signal to the network means; and wherein the network means operates as a switch for coupling any one of the first nodes to any one of the second nodes, wherein the network means operates as a switch for coupling any one of the first nodes to any two or more of the second nodes, and wherein:

an ongoing call utilizes a first communication path from a first one of the second nodes, through the network means, to a first one of the first nodes; and the network means effects a handoff of the ongoing call by establishing a second communications path from the first one of the second nodes to a second one of the first nodes.

2. A cellular telecommunications system comprising:

a plurality of nodes, each for performing at least one of a plurality of cellular telecommunications system functions;

network means for interconnecting the plurality of nodes, wherein the network means operates in accordance with a high speed synchronous protocol wherein the plurality of nodes includes:

a plurality of first nodes, each for performing transceiver functions on a frequency band filtered signal received from the network means; and a plurality of second nodes, each comprising an antenna coupled to a first port of a frequency band filter, the frequency band filter having a second port for coupling to the network means, wherein the antenna supplies a received radio signal to the frequency band filter, and the frequency band filter converts the received radio signal into the frequency band filtered signal and supplies the frequency band filtered signal to the network means; and wherein the network means operates as a switch for coupling any one of the first nodes to anyone of the second nodes, wherein the network means operates as a switch for coupling any one of the second nodes to any two or more of the first nodes.

3. A cellular telecommunications system comprising:

network means operating in accordance with a high speed synchronous protocol;

a plurality of antenna site means, coupled to the network means, each for performing bandwide and channel-wide filtering of a received radio signal, for converting the filtered radio signal into a digitized radio signal, and for supplying the digitized radio signal to the network means; and a plurality of central site means, coupled to receive the digitized radio signal from the network means, each of the central site means performing demodulation and channel decoding on the digitized radio signal, wherein each of the antenna site means utilizes the network means to send the same digitized radio signal simultaneously to any two of the plurality of central site means.

4. A cellular telecommunications system comprising:

network means operating in accordance with a high speed synchronous protocol;

a plurality of antenna site means, coupled to the network means, each for performing bandwide filtering of a received radio signal, for converting the filtered radio signal into a digitized radio signal, and for supplying the digitized radio signal to the network means; and a plurality of central site means, coupled to receive the digitized radio signal from the network means, each of the central site means performing channel-wide filtering, demodulation and channel decoding on the digitized radio signal, wherein each of the antenna site means utilizes the network means to send the same digitized radio signal simultaneously to any two of the plurality of central site means.

5. A cellular telecommunications system comprising:

network means operating in accordance with a high speed digital protocol;

a plurality of antenna site means, coupled to the network means, each for performing bandwide filtering of a received radio signal, for converting the filtered radio signal into a digitized radio signal, and for supplying the digitized radio signal to the network means; and a plurality of central site means, coupled to receive the digitized radio signal from the network means, each of the central site means performing channel-wide filtering, demodulation and channel decoding on the digitized radio signal, wherein the network means operates as a switch to handoff an ongoing call from a first central site means to a second central site means while continuing to use a same one of the antenna site means for the ongoing call.

6. The cellular telecommunications system of claim 5, wherein the high speed digital protocol is a DTM protocol.

7. The cellular telecommunications system of claim 5, wherein each of the antenna site means utilizes the network means to send the same digitized radio signal simultaneously to any two of the plurality of central site means.

8. A cellular telecommunications system comprising:

network means operating in accordance with a high speed digital protocol;

a plurality of antenna site means, coupled to the network means, each for performing channel-wide filtering of a received radio signal, for converting the filtered radio signal into a digitized radio signal, and for supplying the digitized radio signal to the network means; and a plurality of central site means, coupled to receive the digitized radio signal from the network means, each of the central site means performing demodulation and channel decoding on the digitized radio signal, wherein the network means operates as a switch to handoff an ongoing call from a first central site means to a second central site means while continuing to use a same antenna site means for the ongoing call.

9. The cellular telecommunications system of claim 8, wherein the high speed digital protocol is a DTM protocol.

10. The cellular telecommunications system of claim 8, wherein each of the antenna site means utilizes the network means to send the same digitized radio signal simultaneously to any two of the plurality of central site means.

* * * * *